United States Patent
Rajagopalan et al.

(10) Patent No.: US 11,907,701 B2
(45) Date of Patent: Feb. 20, 2024

(54) DEPLOYING SOFTWARE UPDATES IN HYBRID WORKSPACE ENVIRONMENTS

(71) Applicant: Dell Products, L.P., Round Rock, TX (US)

(72) Inventors: Vivekanandh Narayanasamy Rajagopalan, Bangalore (IN); Vivek Viswanathan Iyer, Austin, TX (US); Gokul Thiruchengode Vajravel, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 301 days.

(21) Appl. No.: 17/477,619

(22) Filed: Sep. 17, 2021

(65) Prior Publication Data

US 2023/0086234 A1    Mar. 23, 2023

(51) Int. Cl.
*G06F 8/65*     (2018.01)
*G06F 9/4401*   (2018.01)

(52) U.S. Cl.
CPC .............. *G06F 8/65* (2013.01); *G06F 9/4401* (2013.01)

(58) Field of Classification Search
USPC ........................................................ 717/168
See application file for complete search history.

(56) References Cited

U.S. PATENT DOCUMENTS

| | | | | |
|---|---|---|---|---|
| 10,324,708 | B2 * | 6/2019 | Griffin | G06F 8/65 |
| 2004/0015942 | A1 * | 1/2004 | Branson | G06F 8/65 |
| | | | | 717/168 |
| 2006/0178953 | A1 * | 8/2006 | Aggarwal | G06Q 10/063 |
| | | | | 705/28 |
| 2010/0114825 | A1 * | 5/2010 | Siddegowda | G06F 8/71 |
| | | | | 707/638 |
| 2011/0231455 | A1 * | 9/2011 | Joukov | G06F 16/168 |
| | | | | 707/822 |
| 2017/0034023 | A1 * | 2/2017 | Nickolov | H04L 43/0817 |
| 2018/0113728 | A1 * | 4/2018 | Musani | G06F 11/362 |
| 2019/0227791 | A1 * | 7/2019 | Norris | G06F 9/505 |
| 2019/0227794 | A1 * | 7/2019 | Mercille | G06F 8/36 |
| 2021/0097037 | A1 * | 4/2021 | Babol | G06F 11/1004 |
| 2023/0044016 | A1 * | 2/2023 | Harper | G06F 8/65 |

* cited by examiner

*Primary Examiner* — Qing Chen
*Assistant Examiner* — Clint Thatcher
(74) *Attorney, Agent, or Firm* — Fogarty LLP

(57) ABSTRACT

Systems and methods for deploying software updates in hybrid workspace environments are described. In some embodiments, an Information Handling System (IHS) may include a processor and a memory coupled to the processor, the memory having program instructions stored thereon that, upon execution, cause the IHS to: consolidate an Operating System (OS) and Basic Input/Output System (BIOS) inventory with a plurality of workspace inventories; resolve dependencies among a plurality of updates based upon the consolidated inventories to identify an order of deployment; and deploy the plurality of updates in the order of deployment.

20 Claims, 5 Drawing Sheets

DEPLOYING SOFTWARE UPDATES IN HYBRID WORKSPACE ENVIRONMENTS

FIELD

This disclosure relates generally to Information Handling Systems (IHSs), and, more specifically, to systems and methods for deploying software updates in hybrid workspace environments.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for deploying software updates in hybrid workspace environments are described. In an illustrative, non-limiting embodiment, an Information Handling System (IHS) may include a processor and a memory coupled to the processor, the memory having program instructions stored thereon that, upon execution, cause the IHS to: consolidate an Operating System (OS) and Basic Input/Output System (BIOS) inventory with a plurality of workspace inventories; resolve dependencies among a plurality of updates based upon the consolidated inventories to identify an order of deployment; and deploy the plurality of updates in the order of deployment.

The OS and BIOS inventory may include information about at least one of: an OS version, a BIOS System Identification (ID), or a BIOS version. Additionally, or alternatively, the OS and BIOS inventory may include information about at least one of: a Peripheral Component Interconnect (PCI) device or configuration, or a Plug-and-Play (PnP) device or configuration. Additionally, or alternatively, the OS and BIOS inventory may include information about at least one of: an application identity, or an application version.

Each of the plurality of workspace inventories may be produced by a respective one of a plurality of workspaces. The plurality of workspaces may include at least one software-based container and at least one hardware-based container. Each of the workspace inventories may include information about at least one of: a workspace application identity, or a workspace application version.

The dependencies may include an intra-workspace dependency. Additionally, or alternatively, the dependencies may include an inter-workspace dependency. Additionally, or alternatively, the dependencies may include a Progressive Web App (PWA) dependency. Additionally, or alternatively, the dependencies may include a container-host software dependency. Additionally, or alternatively, the order of deployment may be further identified, at least in part, based upon whether a given update requires a reboot.

In another illustrative, non-limiting embodiment, a memory storage device having program instructions stored thereon that, upon execution by an IHS, cause the IHS to: resolve dependencies among a plurality of updates based upon a plurality of workspace inventories to identify an order of deployment; and deploy the plurality of updates in the order of deployment.

The plurality of workspaces may include at least one software-based container and at least one hardware-based container. The dependencies may include an inter-workspace dependency. The order of deployment may be further identified, at least in part, based upon whether a given update requires a reboot.

In yet another illustrative, non-limiting embodiment, a method may include: resolving dependencies among a plurality of updates based upon a plurality of workspace inventories to identify an order of deployment; and deploying the plurality of updates in the order of deployment. The plurality of workspaces may include at least one software-based container and at least one hardware-based container. The dependencies may include an inter-workspace dependency. The order of deployment may be further identified, at least in part, based upon whether a given update requires a reboot.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
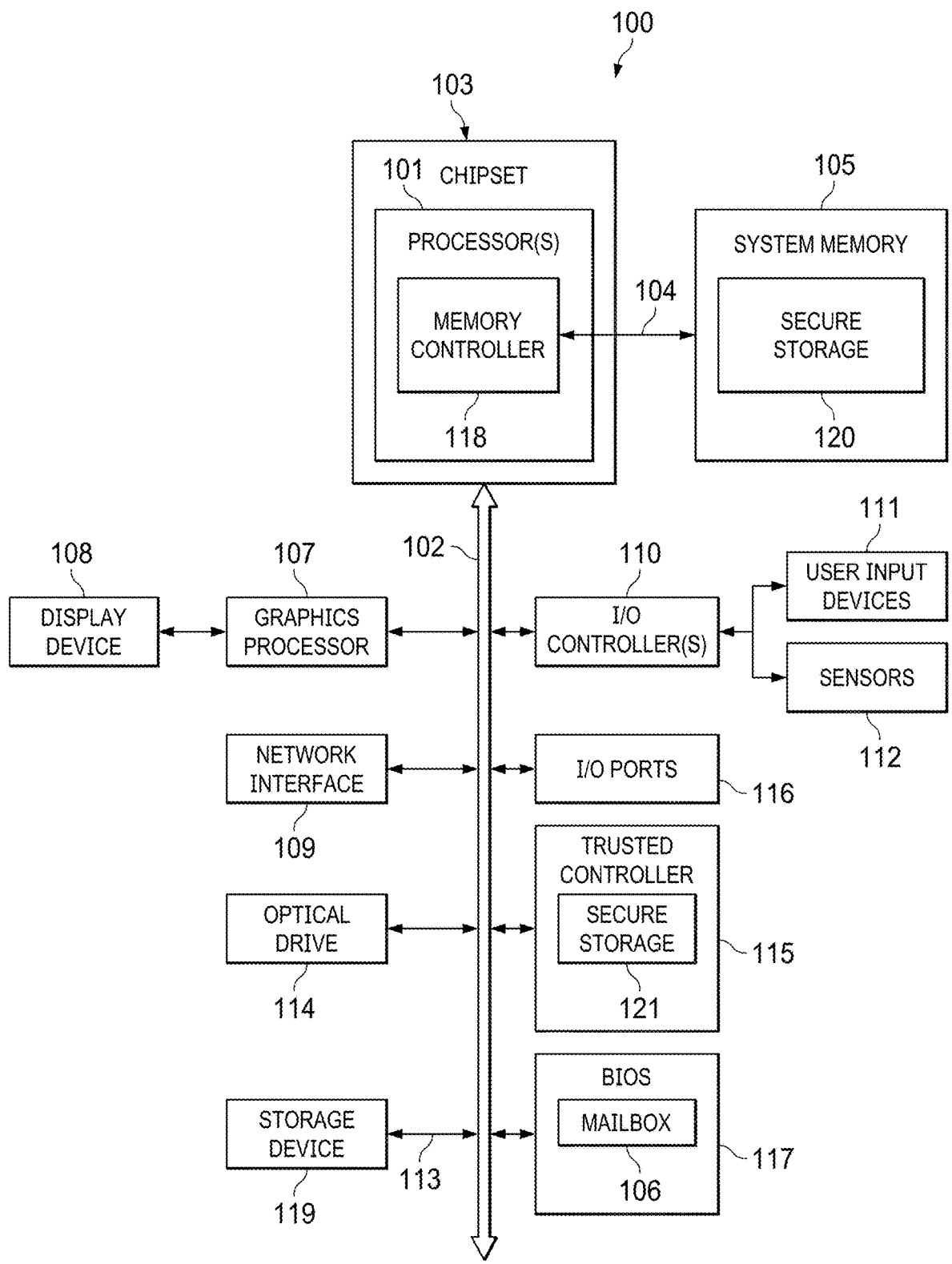
FIG. 1 is a diagram depicting examples of components of an Information Handling System (IHS), according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting components of an example IHS 100 configured to participate in the deployment of software updates in hybrid workspace environments. As shown, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing functions.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, etc. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WIFI and BLUETOOTH. In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from an operating system (OS) of the IHS.

Chipset 102 may also provide access to one or more display device(s) 108 via graphics processor 107. In certain embodiments, graphics processor 107 may be comprised within one or more video or graphics cards or an embedded controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B).

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop in order to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side, the IHS may be determined to be in a book mode. If IHS 100 is determined to be tilted such that the hinge is oriented between horizontal and vertical, the user's face is detected to be facing the integrated display, and IHS 100 is experiencing slight movement, the sensor hub may determine that IHS 100 is being used in a book posture. The sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration, in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. Access to storage devices via an I/O port 116 may result in a change in the security profile of IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. Upon execution, BIOS 117 instructions may facilitate the loading of an OS (e.g., WINDOWS, MACOS, iOS, ANDROID, LINUX, etc.) for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, BIOS 117 includes a predefined memory or memory region that may be referred to as NVM (Non-Volatile Memory) mailbox 106. In such an implementation, mailbox 106 may provide a secured storage location for use in storing access policies, signatures, cryptographic keys, or other data. In certain embodiments, BIOS mailbox 106 may be utilized as a secure storage utilized by a remote orchestration service in order to store access policies and cryptographic keys for use in delivering and deploying a secured container on IHS 100. BIOS mailbox 106 and secured storage 120 in system memory 105 may be utilized in this manner instead of, or in conjunction with, out-of-band functions implemented by trusted controller 115.

In certain embodiments, trusted controller 115 is coupled to IHS 100. For example, trusted controller 115 may be an embedded controller (EC) that is installed as a component of the motherboard of IHS 100. Trusted controller 115 may be additionally configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

Trusted controller 115 may be further configured to recalculate a hash value at a later time for such a component. The hash value recalculated for the component may then be compared against the reference hash value signature to determine if any modifications have been made to a component, thus indicating the component has been compromised. In this manner, trusted controller 115 may be used to validate the integrity of hardware and software components installed on IHS 100.

Trusted controller 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by trusted controller 115 may be used to operate a secure execution environment that may include operations for providing various core operations of IHS 100, such as power management and management of certain modes of IHS 100 (e.g., turbo modes, maximum operating clock frequencies of certain components, etc.).

In managing modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

IHS 100 may support the use of various power modes. In some embodiments, the power modes of IHS 100 may be implemented through operations of trusted controller 115 and/or the OS of IHS 100. In various embodiments, IHS 100 may support different reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These types of power modes may be entered, for example, when IHS 100 transitions into standby (e.g., "sleep," etc.).

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, in certain embodiments, all or a portion of the operations executed by the illustrated components may instead be provided by components integrated into processor(s) 101 as systems-on-a-chip.

Figure 2:
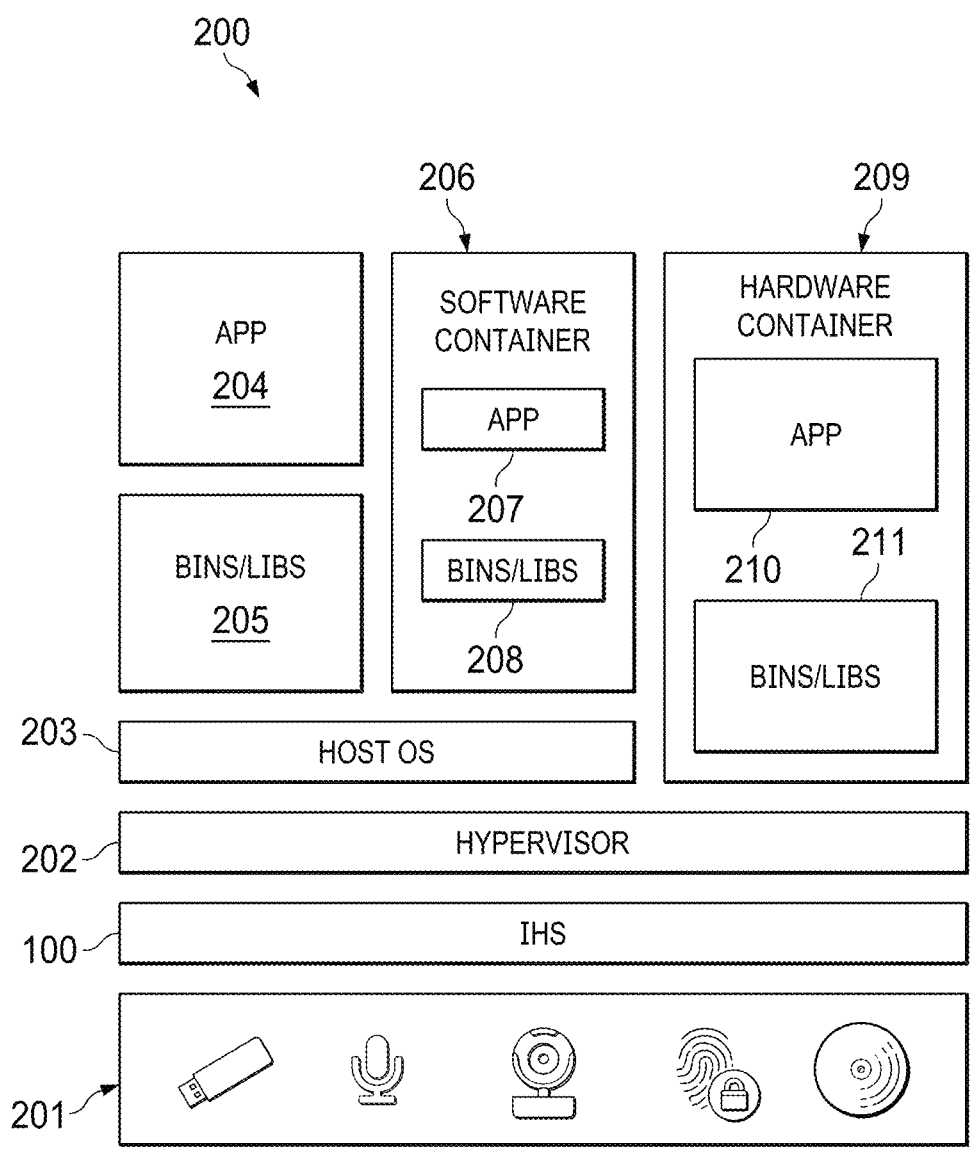
FIG. 2 is a diagram of an example of a hybrid workspace environment, according to some embodiments.

FIG. 2 is a diagram of an example of hybrid workspace environment 200 executable by IHS 100 or the like. In environment 200, peripheral devices 201 may include, for example, input devices 111 (e.g., mice, keyboard, etc.), sensors 112 (e.g., cameras, microphones, etc.), optical drives 114, I/O ports 116, etc. In this implementation, hypervisor 202 is shown as a type-1, native, or bare-metal hypervisor running directly on IHS 100 to manage host OS 203. In other implementations, however, hypervisor 202 may be a type-2 or hosted hypervisor running on top of host OS 203.

To produce and/or manage a first type of workspace, hypervisor 202 may support host OS 203, which in turn enables native application 204 to execute using binary files and/or library files (bins/libs) 205. Additionally, or alternatively, to produce and/or manage a second type of workspace, hypervisor 202 may instantiate software container 206 (e.g., a Virtual Machine (VM), docker, snap, Progressive Web App (PWA), Virtual Desktop Integration (VDI), etc.) through host OS 203, where application 207 executes using container bin/libs 208. Additionally, or alternatively, to produce and/or manage a third type of workspace, hypervisor 202 further may instantiate hardware container 209 (e.g., Hyper-V, INTEL Clear Container, etc.) where application 210 executes using container bin/libs 211.

In some implementations, software container 206 may be configured to execute applications or workloads that do not require a high level of security, for example, because they are trusted, such as application 207. Conversely, hardware container 209 may be configured to execute applications or workloads that do require a high level of security, for example, because they are untrusted, such as application 210. Additionally, or alternatively, hardware container 209 may be configured to execute applications that require an OS different than host OS 203.

In some embodiments, when applications are distributed and/or deployed from a trusted source, software-based container 206 may be used as it generally has less overhead and provides higher containerized application density. Conversely, when applications are distributed and/or deployed from an untrusted source, hardware-based and/or hypervisor-isolated hardware container 209 may be used, despite presenting a higher overhead, to the extent it provides better isolation or security.

Software container 206 shares the kernel of host OS 203 and UEFI services, but access is restricted based upon the user's privileges. Hardware container 209 has a separate instance of OS and UEFI services. In both cases, containers 206 and 209 serve to isolate applications from host OS 203 and other applications.

Systems and methods described herein may be used to deploy, launch, and/or install software updates in hybrid workspace environments. As used herein, the term "update" generally refers a set of changes to a computer program, software, or application, including device drivers and firmware, that is designed to update, fix, and/or improve it (e.g., by fixing security vulnerabilities and other bugs, and/or by increasing the functionality, usability, or performance of a program, etc.). For example, an update may include an executable file that, upon execution, loads a program into memory that manages the installation of the update into the target program(s) on disk. In some cases, a service pack or an update package may include a collection of updates delivered in the form of a single installable file.

In various embodiments, systems and methods described herein may resolve dependencies among a plurality of updates based upon one or more consolidated OS, BIOS, and/or workspace inventories to identify a suitable order (or priority) for deploying each of the updates. Dependencies may include one or more of: intra-workspace dependencies, container-host software dependencies, inter-workspace dependencies, and/or Progressive Web App (PWA) dependencies.

Intra-workspace dependencies occur when an application (e.g., including one or more librar(ies), runtime files, etc.) depends upon another in the same workspace. For instance, consider a scenario where Ubuntu is hosting a Docker image having a Zoom application and its dependencies (e.g., decoders). In some implementations, if a decoder has the latest update, systems and methods described herein may update the decoder inside the container with a package compatible with the Docker image.

Container-host software dependencies occur when there is a sharing of resources between the host OS and a workspace. Particularly, a software-based container may allow an application instantiated therein to share the host-OS kernel libraries, for instance, such that a Docker container hosting a Zoom application may share a webcam and GPU driver installed in the host OS. In some implementations, if there is an update available for webcam driver, systems and methods described herein may identify the compatible webcam driver (for both host OS & container image) and install along with its dependencies before updating the Zoom application inside the container.

Inter-workspace dependencies refer to dependencies between resources deployed across distinct workspaces. Particularly, an application and its dependent libraries may be deployed in different workspaces (e.g., to share the same libraries across different workspaces), for instance, such that an OpenCL library hosted in a first workspace may be used by a Natural Language Processing (NLP) engine in a second workspace and an AutoCAD in a third workspace. In some implementations, systems and methods described herein may identify dependency chains across the workspaces and may service the workspaces accordingly for minimal downtime.

PWA dependencies occur when a PWA has dependent services running on the host, another PWA, and/or in a workspace. For example, an AutoCAD PWA running in Chrome may use an OpenCL lib running in a given workspace. In some implementations, systems and methods described herein may identify such dependency chains across PWAs and workspaces.

In some cases, the order of deployment of software updates may also be based on contextual information (e.g., type of user, identity of user, proximity of a user, type of IHS, identity of IHS, IHS location, type of workspace executed, types of peripheral devices and capabilities thereof, time-of-day, calendar information, meeting information, identity of other users or IHSs with access to the same IHS, etc.).

For example, in a certain context (e.g., IHS 100 is at a work location, etc.), an update for an application executed in hardware-based container 209 may be deployed, as part of an overall sequence of updates for IHS 100, before another update for another application executed in software-based container 206; that is, the hardware-based container application may be given priority over the software-based container application with respect to the deployment of their respective updates. Conversely, in another context (e.g., IHS 100 is at a home location, etc.), an update for an application executed in software-based container 206 may take precedence over another update for another application executed in hardware-based container 209.

Systems and methods described herein may also deploy compatible updates in the right order. For example, a Maxx Wave Audio Driver update would be installed before installing the Maxx Wave Audio Application update. Moreover, in the case of workspace management, the order may be defined based on the set of applicable updates.

Additionally, or alternatively, systems and methods described herein may cause minimal interruption during the service time window. Many drivers, firmware and workspace updates need a reboot to complete installation of the update. For example, if a host OS reboots to complete a firmware update while a workspace update (or an update of an application inside a workspace) is in progress, then the entire workspace may reach an unstable state. Using systems and methods described herein, however, update tools may help the Information Technology Decision Maker (ITDM) to ensure minimal (or reduced) number of reboots in the entire update installation or deployment process.

Figure 3:
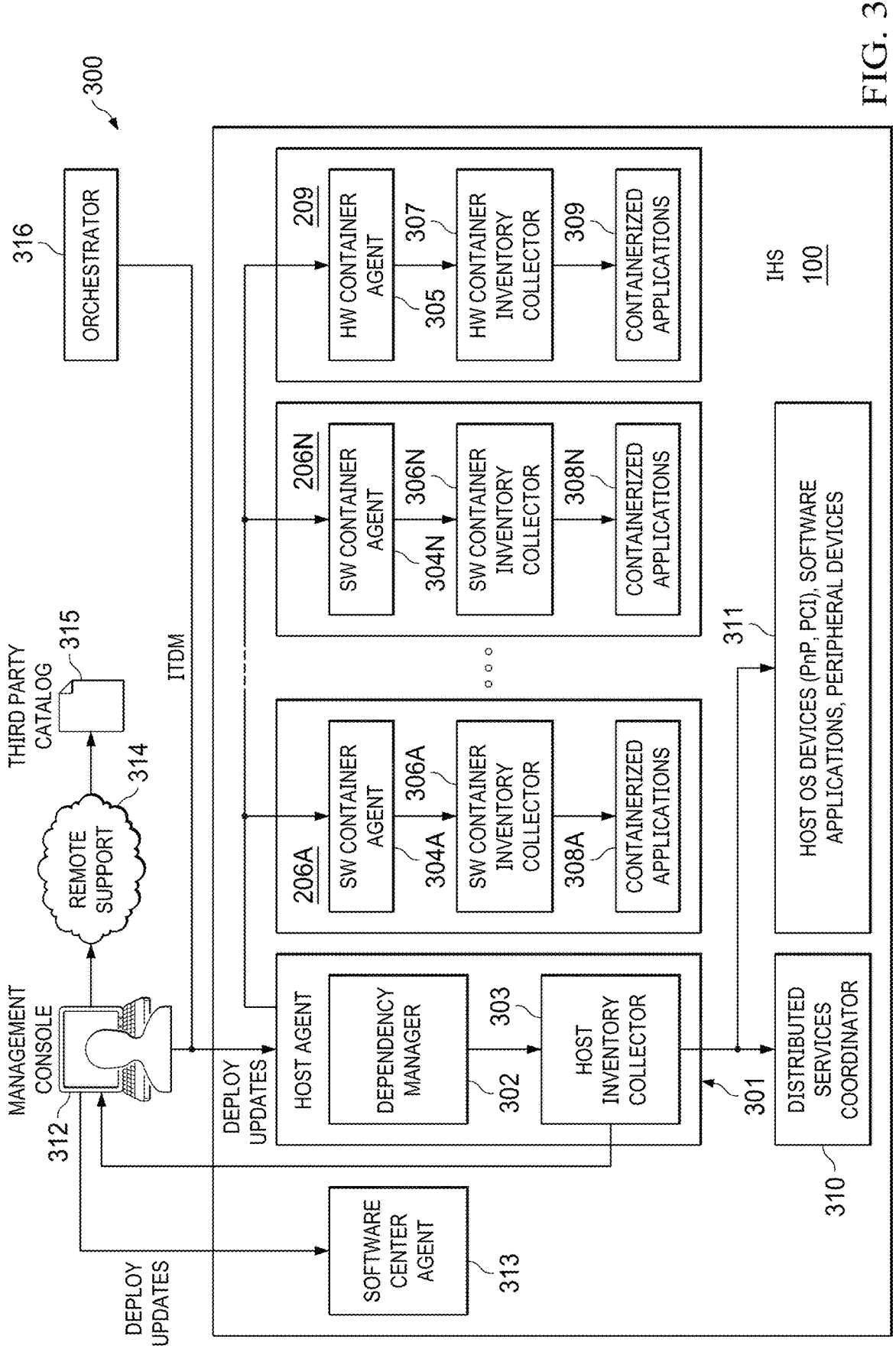
FIG. 3 is a diagram of an example of a system for deploying software updates in hybrid workspace environments, according to some embodiments.

FIG. 3 is a diagram of an example of system 300 for deploying software updates in hybrid workspace environments. In some embodiments, system 300 includes IHS 100 configured to instantiate host agent 301, software-based containers 206A-N, and/or hardware-based container 209. In addition, IHS 100 is configured to instantiate distributed services coordinator 301, host OS devices (PnP, PCI), software applications, and/or peripheral devices 311, and software center agent 313.

Host agent 301 includes dependency manager 302 and host inventory collector module 303. Each of containers 206A-N and 209 includes a respective container agent 304A-N and 305, container inventory collector module 306A-N and 307, and application(s) 308A-N and 309. Software center agent 313 is configured to receive instructions (e.g., update instructions) from an ITDM's management console 312. In some cases, management console 312 may operate under control of orchestrator service 316. ITDM's management console 312 may also have access to third-party catalog 315 via remote support service 314.

Particularly, host agent 301 may run on the host OS. Inventory collectors 303, 306A-N, and 307 may be included in host agent 301 and container agents 304A-N and 305. Dependency manager module 302 is part of host agent 301 and may orchestrate the collection of inventories on the host OS and on all containers or workspaces.

Host inventory collector module 303 may collect host OS and BIOS inventory (e.g., OS Version, BIOS System ID, BIOS Version, etc.). Host inventory collector module 303 may also scan IHS 100 for PCI devices or drivers, PnP devices or drivers, and/or others software applications, and it may collect the currently installed applications details. Then, inventory collector module 303 identifies the workspaces—software and/or hardware container(s)—running in the host OS and their IP addresses.

Dependency manager 302 may invoke an inventory collection processes inside of each container running on the host OS. Each of container inventory collection modules 306A-N and 307 may inventory containerized applications 308A-N and 309 running on IHS 100 (e.g., application name or identifier, version, plugins, etc.), and it may return a corresponding inventory to its respective container agent 304A-N and 305.

Dependency manager 302 may consolidate OS and Basic Input/Output System BIOS inventor(ies) with a plurality of workspace inventories, identify applicable updates, and prepare a list or table of workspace updates.

Table 1 shows an example of software update dependencies after inventory collection from the host and its containers:

TABLE 1

| Type of Update | Target | Reboot Required | Dependent On |
|---|---|---|---|
| Audio Driver | Host OS | No | No Dependency |
| BIOS FW | Host OS | Yes | No Dependency |
| NLPEngine.exe | SW Container | No | HW Container (GPULib.exe) |
| GPULib.exe | HW Container | Yes | No Dependency |
| Zoom.exe | SW Container | No | HW Container (GPULib.exe, Zoom.exe) |
| Container Image | SW Container | Yes | No Dependency |

Dependency manager 302 may resolve dependencies among the various updates, and it may prepare another list or table with a suitable order of installation. For example, dependency manager 302 may access third-party catalog and/or remote support 314 through management console 312 to retrieve a list of the latest updates for each application, driver, or workspace part of the consolidated inventory. The evaluation of priorities may be performed based upon one or more rules selected by the ITDM, for example, in the form of a JSON or XML file or policy.

For instance, in some implementations, software updates without any dependencies may be deployed first, a software update that depends upon another update may be deployed after the other update is deployed, and software updates that require one or more reboots may be deployed last.

Upon application of these rules to the updates of Table 1, Table 2 may be generated as example of order of deployment or priority:

TABLE 2

| Order | Type of Update | Target | Reboot Required | Dependent On |
|---|---|---|---|---|
| 1 | Audio Driver | Host OS | No | No Dependency |
| 2 | Container Image | SW Container 1 | Yes | No Dependency |
| 3 | GPULib.exe | HW Container 1 | Yes | No Dependency |
| 4 | Zoom.exe | SW Container 1 | No | HW Container (GPULib.exe, Zoom.exe) |
| 5 | NLPEngine.exe | SW Container N | No | HW Container (GPULib.exe) |
| 6 | BIOS FW | Host OS | Yes | No Dependency |

In some embodiments, when the ITDM uses management console 312 to manage IHS 100 running workspaces 206A-N and 209, for example, software center agent 313 may be used to deploy host agent 301 and to allow it to manage update dependencies using dependency manager 302. Moreover, management console 312 may build and/or deploy update packages using software center agent 313.

Figure 4A:
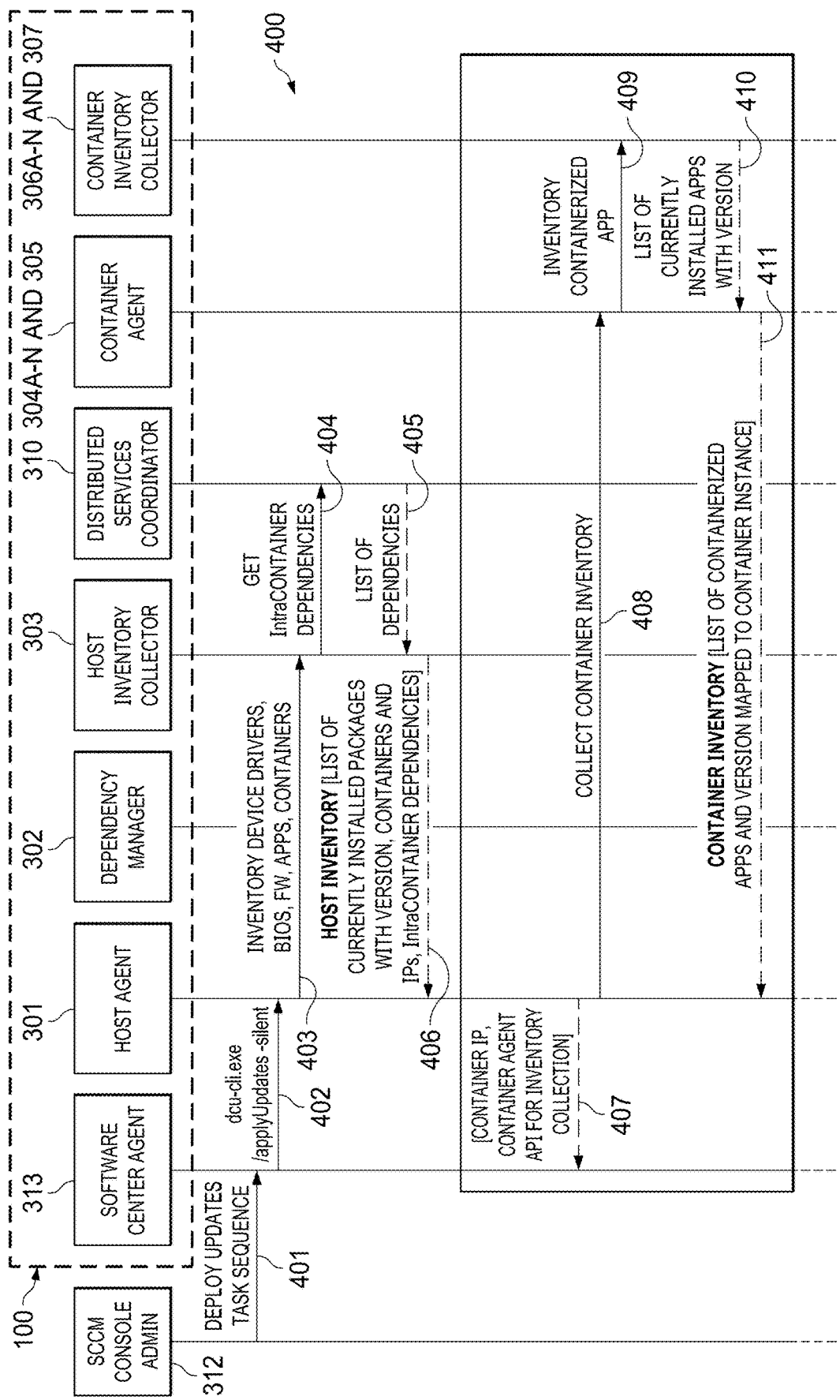
FIGS. 4A and 4B are a diagram of an example of a method for deploying software updates in hybrid workspace environments, according to some embodiments.
Figure 4B:
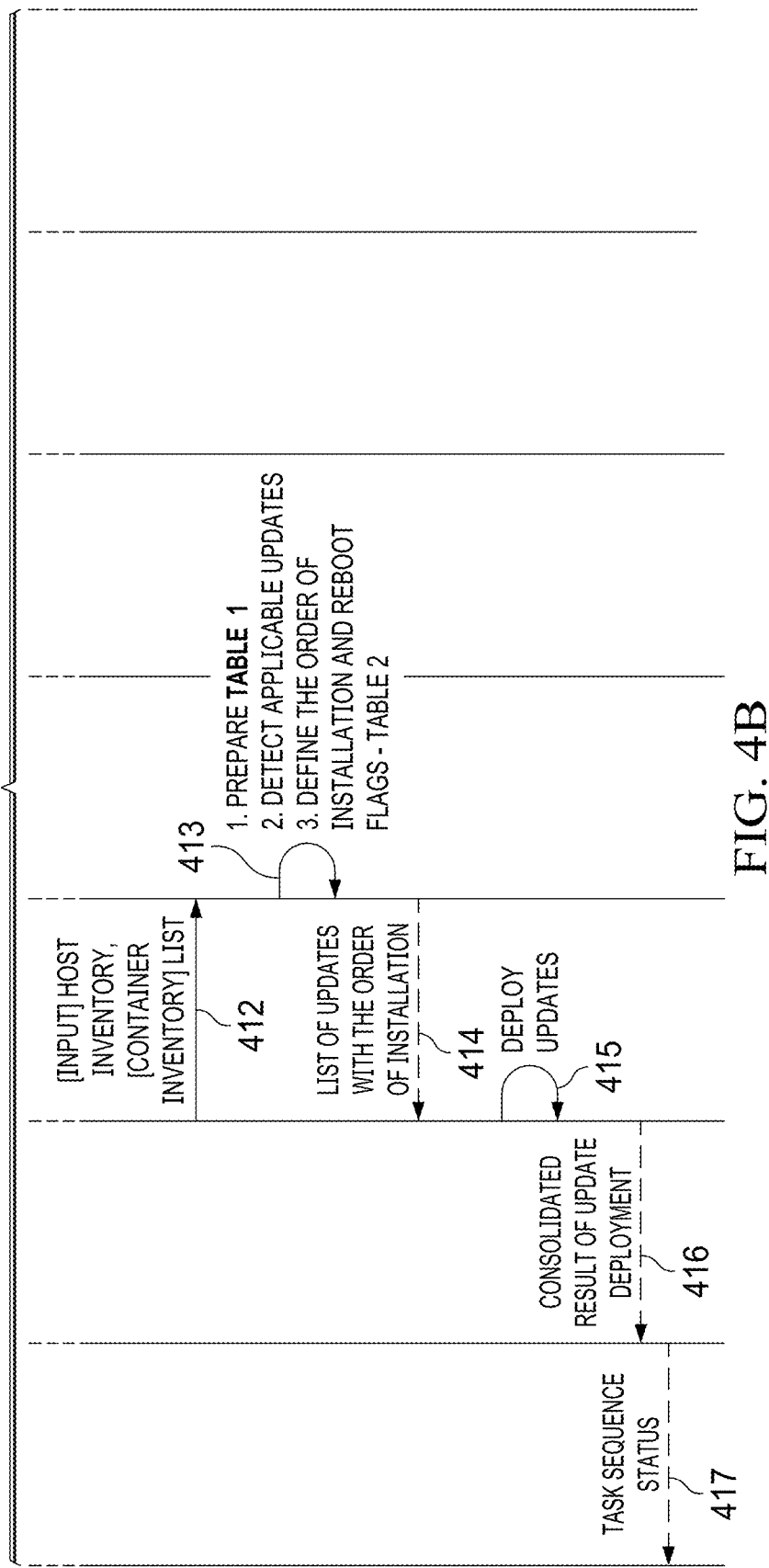

FIGS. 4A and 4B show a diagram of an example of method 400 for deploying software updates in hybrid workspace environments. In some implementations, method 400 may be performed, at least in part, through the operation of the system components described in FIG. 3.

At 401, management console 312 deploys an update test sequence to IHS 100 via software center agent 313. At 402, software center agent 313 sends a list of updates to host agent 301. At 403, host agent 301 commands host inventory collector module 303 to inventory device drivers, BIOS, firmware, applications, and/or containers. At 404, host inventory collector 303 requests a list of intra-container dependencies from distributed services coordinator 310, and at 405 it receives the list. Then, at 406, host inventory collector module 303 sends the host inventory (list of currently installed packages with version, containers and IP addresses, and intra-container dependencies).

For sake of illustration, an example output of host inventory collector module 303 may be as follows:

```
<SVMInventory lang="en" schemaVersion="1.0" timeStamp="2021-04-28T15:07:39" invcolVersion="8.1.6.1">
  <OperatingSystem osVendor="Microsoft" osCode="WIN" osArch="x64" majorVersion="10" minorVersion="0" spMajorVersion="0" spMinorVersion="0" buildNumber="17134"/>
  <System systemID="0823" TPMmeasurementsOn="false"/>
  <Device componentID="159" display="BIOS" impactsTPMmeasurements="true">
    <Application componentType="BIOS" version="1.14.1" display="BIOS"/>
  </Device>
  <Device vendorID="10EC" deviceID="0225" subDeviceID="0823" subVendorID="1028" bus="0" device="0" function="0" display="Realtek Audio"> <Application componentType="DRVR" version="6.0.1.8285" packageVersion="0" display="Realtek Audio Driver"/>
  </Device>
  <Device containerType="Software">
    <Application componentType="CNTR" version="6.0.1.8285" ipAddress"1.2.3.4" display="Docker Container"/>
  </Device>
  <Device containerType="Hardware"> <Application componentType="CNTR" version="1.0.2.8285" ipAddress"1.2.3.5" display="Windows VM"/>
  </Device>
</SVMInventory>
```

Moreover, an example output of container inventory collector module 306A-N or 307 may be as follows:

```
<SVMInventory lang="en" schemaVersion="1.0" timeStamp="2021-04-28T15:07:39" invcolVersion="8.1.6.1">
  <Container containerType="software">
    <Application componentType="CNTR" version="6.0.1.8285" ipAddress"1.2.3.4" display="Docker Container"/>
```

```
</Container>
<Device display="Zoom">
<Application componentType="APAC" version="5.3.1" display="Zoom"/>
</Device>
</SVMInventory>
```

Loop 407 may be executed for each of workspaces 206A-N and/or 209. Particularly, at 408 host agent 301 may send a command to container agent 304A-N or 305 to collect container inventory (e.g., container IP, container agent API for inventory collection). At 409, container agent 304A-N or 305 may send the request for inventory to container inventory collector 306A-N or 307, and at 410 container inventory collector 306A-N or 307 may send a list of currently installed applications 308A-N or 309, with each version. At 411, container agent 304A-N or 305 may send the container inventory (e.g., a list of containerized applications and version mapped to a container instance).

At 412, host agent 301 may send the host inventory to dependency manager 302. At 413, dependency manager 302 may prepare a table of software update dependencies after inventory collection from the host and its containers (e.g., Table 1), detect applicable updates, and define the order installation and reboot flags (e.g., Table 2). At 414, dependency manager 302 may send the list with the deployment order to host agent 301.

At 415, host agent 301 may deploy the updates following the order received from dependency manager 302. At 416, host agent 302 may send a consolidated result of update deployment to software center agent 313. At 417, software center agent 313 may send task sequence status to management console 312.

Accordingly, in various embodiments, systems and methods described herein may resolve the dependencies of updates across the host OS, inter/intra workspaces, workspace types, and applications deployed in the workspaces. Additionally, or alternatively, these systems and methods provide the ability to define deployment order of the update packages to ensure the functioning of the devices and workspaces and optimization of reboot cycles despite the complexities introduced by complexities introduced by hybrid workspace environments.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the IHS to:
consolidate an Operating System (OS) and Basic Input/Output System (BIOS) inventory with a plurality of workspace inventories;
resolve dependencies among a plurality of updates based upon the consolidated inventories to identify an order of deployment; and
deploy the plurality of updates in the order of deployment.

2. The IHS of claim 1, wherein the OS and BIOS inventory comprises information about at least one of: an OS version, a BIOS System Identification (ID), or a BIOS version.

3. The IHS of claim 1, wherein the OS and BIOS inventory comprises information about at least one of: a Peripheral Component Interconnect (PCI) device or configuration, or a Plug-and-Play (PnP) device or configuration.

4. The IHS of claim 1, wherein the OS and BIOS inventory comprises information about at least one of: an application identity, or an application version.

5. The IHS of claim 1, wherein each of the plurality of workspace inventories is produced by a respective one of a plurality of workspaces.

6. The IHS of claim 5, wherein the plurality of workspaces comprises at least one software-based container and at least one hardware-based container.

7. The IHS of claim 5, wherein each of the workspace inventories comprises information about at least one of: a workspace application identity, or a workspace application version.

8. The IHS of claim 1, wherein the dependencies comprise an intra-workspace dependency.

9. The IHS of claim 1, wherein the dependencies comprise an inter-workspace dependency.

10. The IHS of claim 1, wherein the dependencies comprise a Progressive Web App (PWA) dependency.

11. The IHS of claim 1, wherein the dependencies comprise a container-host software dependency.

12. The IHS of claim 1, wherein the order of deployment is further identified, at least in part, based upon whether a given update requires a reboot.

13. A non-transitory, computer-readable storage medium having program instructions stored thereon that, upon execution by an Information Handling System (IHS), cause the IHS to:

consolidate an Operating System (OS) and Basic Input/Output System (BIOS) inventory with a plurality of workspace inventories;

resolve dependencies among a plurality of updates based upon the consolidated inventories to identify an order of deployment; and deploy the plurality of updates in the order of deployment.

14. The non-transitory, computer-readable storage medium of claim 13, wherein workspaces in the plurality of workspace inventories comprise at least one software-based container and at least one hardware-based container.

15. The non-transitory, computer-readable storage medium of claim 13, wherein the dependencies comprise an inter-workspace dependency.

16. The non-transitory, computer-readable storage medium of claim 13, wherein the order of deployment is further identified, at least in part, based upon whether a given update requires a reboot.

17. A method, comprising:

consolidating an Operating System (OS) and Basic Input/Output System (BIOS) inventory with a plurality of workspace inventories;

resolving dependencies among a plurality of updates based upon the consolidated inventories to identify an order of deployment; and deploying the plurality of updates in the order of deployment.

18. The method of claim 17, wherein workspaces in the plurality of workspace inventories comprise at least one software-based container and at least one hardware-based container.

19. The method of claim 17, wherein the dependencies comprise an inter-workspace dependency.

20. The method of claim 17, wherein the order of deployment is further identified, at least in part, based upon whether a given update requires a reboot.

* * * * *